(12) United States Patent
Galhard Grassi et al.

(10) Patent No.: US 10,030,130 B2
(45) Date of Patent: Jul. 24, 2018

(54) POLYSTYRENE AND POLYLACTIC ACID BLENDS

(71) Applicants: PETRÓLEO BRASILEIRO S.A.—PETROBRAS, Rio de Janeiro, RJ (BR); UNIVERSIDADE FEDERAL DO RIO GRANDE DO SUL—UFRGS, Porto Alegre, RS (BR); Vinicius Galhard Grassi, Porto Alegre (BR); Augusto Cesar De Carvalho Peres, Rio de Janeiro (BR); Marcus Fernando Dal Pizzol, Porto Alegre (BR); Joao Manoel Da Costa, Rio de Janeiro (BR); Andreia Ossig, Porto Alegre (BR); Cesar Liberato Petzhold, Porto Alegre (BR)

(72) Inventors: Vinicius Galhard Grassi, Porto Alegre (BR); Augusto Cesar De Carvalho Peres, Rio de Janeiro (BR); Marcus Fernando Dal Pizzol, Porto Alegre (BR); Joao Manoel Da Costa, Rio de Janeiro (BR); Andreia Ossig, Porto Alegre (BR); Cesar Liberato Petzhold, Porto Alegre (BR)

( * ) Notice: Subject to any disclaimer, the term of this patent is extended or adjusted under 35 U.S.C. 154(b) by 0 days.

(21) Appl. No.: 14/894,746

(22) PCT Filed: May 16, 2014

(86) PCT No.: PCT/BR2014/000161
§ 371 (c)(1),
(2) Date: Nov. 30, 2015

(87) PCT Pub. No.: WO2014/194391
PCT Pub. Date: Dec. 11, 2014

(65) Prior Publication Data
US 2016/0130430 A1    May 12, 2016

(30) Foreign Application Priority Data

Jun. 6, 2013 (BR) .......................... 10 2013 013965

(51) Int. Cl.
| C08L 25/06 | (2006.01) |
| B41J 2/01 | (2006.01) |
| B41J 2/435 | (2006.01) |
| C09D 11/00 | (2014.01) |
| C08L 35/02 | (2006.01) |
| C08L 63/00 | (2006.01) |
| C08L 67/04 | (2006.01) |
| G09F 23/08 | (2006.01) |
| C08L 51/04 | (2006.01) |
| B29B 9/12 | (2006.01) |
| B29K 25/00 | (2006.01) |

(52) U.S. Cl.
CPC ................ C08L 25/06 (2013.01); B29B 9/12 (2013.01); B41J 2/01 (2013.01); B41J 2/435 (2013.01); C08L 35/02 (2013.01); C08L 51/04 (2013.01); C08L 63/00 (2013.01); C08L 67/04 (2013.01); C09D 11/00 (2013.01); G09F 23/08 (2013.01); B29K 2005/00 (2013.01); B29K 2025/06 (2013.01)

(58) Field of Classification Search
CPC ........... C08L 25/06; C08L 67/04; C08L 53/00
See application file for complete search history.

(56) References Cited

U.S. PATENT DOCUMENTS

| 6,221,316 B1 | 4/2001 | Hanggi et al. |
| 6,326,458 B1 | 12/2001 | Gruber et al. |
| 6,939,906 B2 * | 9/2005 | Hoshi ..................... C08L 25/06 524/291 |
| 7,507,561 B2 | 3/2009 | Ramakrishna et al. |
| 7,999,021 B2 * | 8/2011 | Kumazawa ............. C08L 25/12 524/112 |
| 8,080,297 B2 | 12/2011 | Kravitz et al. |
| 2009/0123728 A1 | 5/2009 | Cheung et al. |
| 2010/0112357 A1 | 5/2010 | Fine et al. |
| 2011/0218257 A1 | 9/2011 | Noordegraaf et al. |
| 2013/0005852 A1 | 1/2013 | Wang et al. |

FOREIGN PATENT DOCUMENTS

| BR | PI0710416 A2 | 8/2011 |
| CA | 2 818 400 A1 | 6/2013 |
| JP | 2008-120572 A | 5/2008 |
| MX | 2011003767 A | 9/2011 |
| TW | 201040085 A | 11/2010 |
| WO | 2010/120673 A1 | 10/2010 |
| WO | 2012/109144 A1 | 8/2012 |
| WO | 2012/150349 A2 | 11/2012 |

OTHER PUBLICATIONS

International Search Report for PCT/BR2014/000161 dated Jun. 24, 2014.

* cited by examiner

*Primary Examiner* — Vickey Nerangis
(74) *Attorney, Agent, or Firm* — Sughrue Mion, PLLC

(57) ABSTRACT

Polymeric blends of polystyrene (PS) and polylactic acid (PLA) are described, in the preparation of which a compatibilizing agent was added, preferably a PS-PLA block copolymer. Such compatibilizing agents act controlling phase separation of the blending compounds, and preventing excessive growth of polystyrene domains scattered in the PLA matrix; and this results in blends with good mechanical and thermal resistance.

21 Claims, 2 Drawing Sheets
(2 of 2 Drawing Sheet(s) Filed in Color)

US 10,030,130 B2

POLYSTYRENE AND POLYLACTIC ACID BLENDS

CROSS REFERENCE TO RELATED APPLICATIONS

This application is a National Stage of International Application No. PCT/BR2014/000161 filed May 16, 2014, claiming priority based on Brazilian Patent Application No. BR 10 2013 013965-3 filed Jun. 6, 2013, the contents of all of which are incorporated herein by reference in their entirety.

BACKGROUND OF THE INVENTION

The present invention refers to polystyrene (PS) and poly-lactic acid (PLA) blends having as compatibilizing agent a PS-PLA block copolymer. Due to the thermodynamic incompatibility between PS and PLA, their blends result in heterogeneous materials with inadequate mechanical, thermal and processability properties for the intended applications; this can be reversed by adding a compatibilizing agent, as described in this invention patent application

THE BASIS OF THE INVENTION

The use of raw materials from renewable sources replacing the ones from fossil sources in polymer production has been growing rapidly in the last years, driven by society's demand for environmentally responsible products. However, polymers from renewable sources are still expensive, not easily available, and their properties and processability characteristics fail to meet market needs.

Polymers that are made through petrochemical processes, from fossil sources, on the other hand, are inexpensive, easily available and have properties and processibility characteristics that can accommodate diverse applications.

Therefore, an alternative to overcome the deficiency of the polymers from renewable sources is to produce blends with polymers from fossil sources. However, in some cases, there is incompatibility between the polymers in those blends, which results in products of poor quality and with inadequate chemical and mechanical properties for the intended applications.

In order to make it easier to obtain polymeric blends containing polymers from renewable sources, most of the available literature mentions the use of compatibilizing agents.

Patent application number US 2009/0123728 describes blends of aromatic alkenyl polymers such as styrenic polymers (for example, polystyrene and high-impact polystyrene) and biopolymers or biodegradable polymers (polylactic acid, polyglycolic acid (PGA), polyhydroxyalkanoate (PHA), polybutylene succinate (PBS) and polycaprolactone (PCL) compatibilized with a styrene-based copolymer (styrene-ethylene-butylstyrene block copolymer (SEBS), SEBS functionalized with a maleate group, styrene-anhydride maleic copolymers, styrene-methyl methacrylate copolymers (SMMA)) or a mixture of two or more copolymers based on styrene, such as SEBS and SMMA.

Document number WO 2010/120673 presents blends of polyolefins with a biodegradable polymer, such as polylactic acid (PLA) and polyhydroxybutyrate, which are compatibilized by a copolymer constituted by an olefin functionalized with a methacrylic group.

Similarly, we can also mention document WO 2012/109144, which covers polylactic acid blends. Such blends are produced through a process involving the contact of a polyolefin with a polylactic acid and a reactive modifier acting as a compatibilizing agent. The modifier is a glycidyl methacrylate-grafted polypropylene (PP-g-GMA).

Therefore, the technique still needs compatibilizing agents for the PLA and polystyrene blends, since they are thermodynamically incompatible, as per the detailed description below.

SUMMARY OF THE INVENTION

The present invention provides blends of polystyrene and polylactic acid with polystyrene making use of a compatibilizing agent, in this case the PS-PLA block copolymer.

Such blends are constituted by a PLA/HIPS mixture, where PLA mass percent is between 30% and 70% and HIPS mass percent is between 70% and 30%, with a compatibilizing agent being added to the mixture, in this case the PS-PLA block copolymer in a concentration of 0.1% to 15% in relation to the mass of PS-PLA mixture.

The compatibilizing agent, the PS-PLA block copolymer, allows the control and the morphological stability of the HIPS/PLA mixture. If no compatibilizing agent is added to HIPS/PLA polymeric blends, separation of the HIPS and PLA mixture phases occurs, resulting in a heterogeneous material with unstable mechanical and thermal properties.

Property instability occurs because HIPS and PLA have different mechanical and thermal resistances; therefore each phase will behave as a separate compound. In other words, the PLA phase will have mechanical and thermal properties inferior to those of the HIPS phase.

In the situation of blends using the compatibilizing agent, which is the object of this invention, it is possible to control phase separation after the mixture of melted compounds cools down through the compatibilizing agent, which does not allow excessive growth of the discrete domains. This morphological control generates a homogeneous material with stable mechanical and thermal properties; in other words, their properties do not change due to cooling and processing.

BRIEF DESCRIPTION OF THE FIGURES

The patent or application file contains at least one drawing executed in color. Copies of this patent or patent application publication with color drawings will be provided by the Office upon request and payment of the necessary fee.

DETAILED DESCRIPTION OF THE INVENTION

Figure 1:
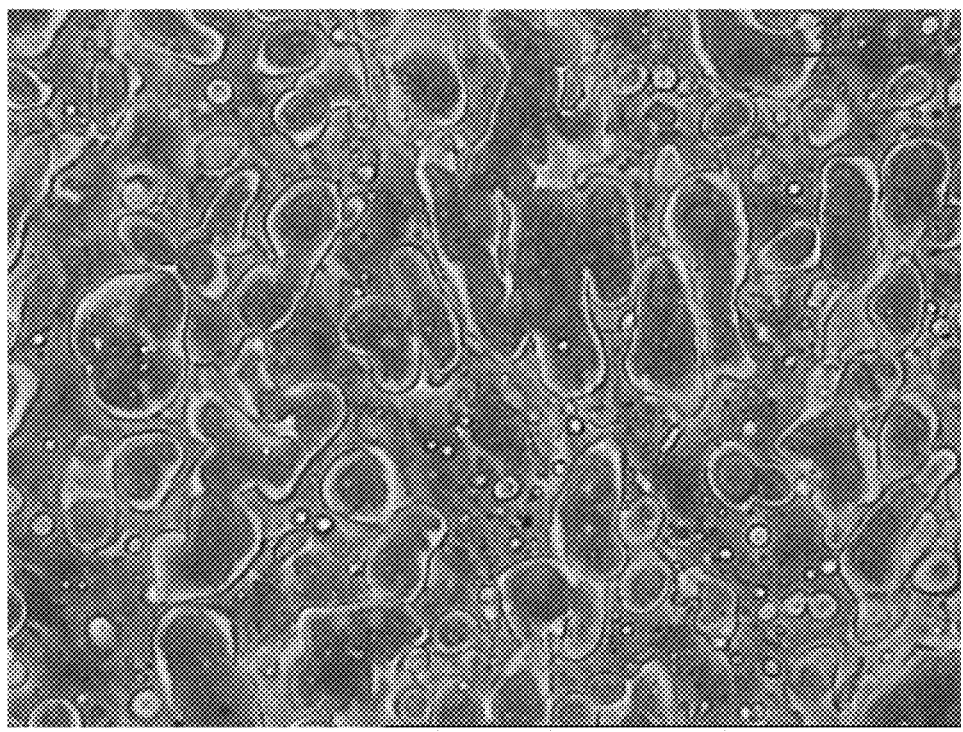
FIG. 1: Optical microscope image of a non-compatibilized HIPS and PLA blend (800× magnification)

Generally speaking, the invention covers the polystyrene blends (PS), especially high-impact polystyrene (HIPS) with polylactic acid (PLA) produced via melting, having the PS-PLA block copolymer as a compatibilizing agent.

Such blends are constituted by PLA and polystyrene, with the addition of a compatibilizing agent, with the following mass proportions:
  a) Mixture of polystyrene/PLA, where the polystyrene concentration range is from 70% m/m to 30% m/m, preferably from 60% m/m to 40% m/m, and the PLA concentration range is from 30% m/m to 70% m/m, preferably from 40% m/m to 60% m/m;

b) PS-PLA block copolymer in concentrations of 0.1% to 15% in relation to the polystyrene/PLA mixture, preferably from 3% to 12%, but ideally from 5% to 10%.

A polystyrene obtained through bulk or solution polymerization is used for the polystyrene/PLA mixture. Preferably, the polystyrene is a high-impact polystyrene (HIPS), having as its base a matrix of styrene-based polymer and, dispersed in this matrix, a rubber phase made of discrete particles of rubber based on butadiene and/or styrene-butadiene copolymer with a different microstructure (cis, trans and vinyl).

Such rubber particles are dispersed in the polymeric matrix in concentrations by mass between 3% and 15% of the total composition.

The morphology of the rubber particles useful for the invention is known as "core Shell" or "salami", or even as a mixture of these in different proportions, and its average diameter may vary from 0.1 microns to 8 microns over a distribution curve of particle sizes. The styrenic matrix presents, in general, a weighted average molar mass (Mw) between 120,000 g/mol and 300,000 g/mol.

The adequate PLA for this blend can be obtained by lactic ring opening polymerization, such as mentioned in U.S. Pat. No. 7,507,561 and U.S. Pat. No. 6,326,458, without limitation to those. PLA may present different D or L isomers and can generate PLLA, PDLA or even a mixture of isomers, generating PDLLA, with PLA's average number molar mass (Mn) ranging from 30,000 g/mol to 200,000 g/mol, preferably from 50,000 g/mol to 160,000 g/mol.

Due to the thermodynamic incompatibility of the polystyrene/PLA mixture, a compatibilizing agent is added to it, in this case, a PS-PLA block copolymer, which is obtained in two phases.

In the first phase, the PS block with OH terminal functionality (hydroxyl group) is synthesized via an atom transfer radical polymerization (ATRP), with tribromoethanol as initiator.

In the second phase, the PS-OH block is used to initiate the polymerization by opening the lactic ring, forming the PS-PLA block copolymer, where the average number molar mass (Mn) of the PS block is from 2,000 g/mol to 20,000 g/mol, preferably from 5,000 g/mol to 15,000 g/mol, and the number average molar mass (Mn) of the PLA block is 2,000 g/mol to 20,000 g/mol, preferably from 5,000 g/mol to 15,000 g/mol.

The PLA block used to obtain the PS/PLA copolymer used as compatibilizing agent can present different D or L isomers, in other words, the block can be PLLA, PLDA or even a mixture of PDLLA isomers. Preferably, PS and PLA blocks have the same molar mass, but they may also have different molar masses.

Figure 2:
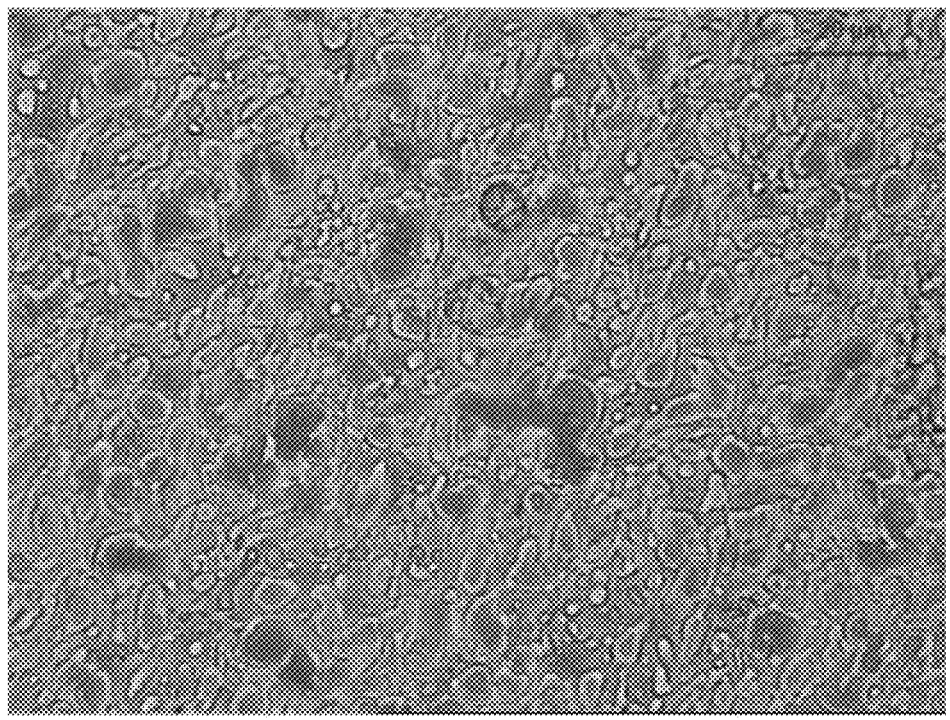
FIG. 2: Optical Microscope image of a compatibilized HIPS and PLA blend (800× magnification)

Polystyrene/PLA polymeric blends produced through a compatibilizing agent such as in this invention, present smaller HIPS domains, indicating that there was morphological control due to the use of the compatibilizing agent, controlling phase separation between the components of the blend and not allowing excessive growth of the dispersed HIPS domains in the PLA matrix, as illustrated in FIG. 2.

This morphological control does not take place in blends produced without the compatibilizing agent, as observed in FIG. 1, where it is possible to verify the heterogeneity of the HIPS domains scattered in the PLA matrix, evidencing the phase separation that occurs after the molten mixture cools down.

The polymeric blends which are the object of this invention can be produced through a mixture of molten PS and PLA, with the addition of a PS-PLA block copolymer. The mixture can be made in a single or double-screw extruder. After the mixture, the compatibilized blend is cooled in a water bath and pelletized.

The mixture temperature at the extruder must be between 160° C. and 230° C., preferably between 165° C. and 210° C., and ideally between 170° C. to 190° C. After being pelleted, the compatibilized blend can be processed later via extrusion to generate a thermoforming plate or be injected into a mold which will define its final shape.

Example 1

This example illustrates the preparation of a blend of 40% m/m of HIPS containing 6% m/m of polybutadiene (Innova R 870E) and 60% of PLLA without the compatibilizing agent.

The materials were mixed, according to the indicated proportions, by extrusion, at a temperature of 180° C., with the resulting blend being cooled in a water bath. In this case, there was a phase separation and the heterogeneity of the mechanical and thermal properties of the blend was preserved as can be seen in FIG. 1.

Example 2

This example illustrates the preparation of a blend which is the object of this invention.

A mixture was prepared by melting 60% m/m of HIPS containing 6% m/m of polybutadiene (Innova R 870E) and 40% m/m of PLLA, with 10% m/m of a PS-PLA compatibilizing agent in relation to the total HIPS and PLA. The materials were blended by extrusion at 210° C. and the resulting blend was cooled in a water bath. There was no phase separation, as shown in FIG. 2, and the mechanical and thermal properties were homogeneous. Izod impact resistance (as per ASTM D 256) was 18 J/m, and heat deflection temperature (HDT, as per ASTM D 684) was 73.6° C.

Example 3

This example shows the preparation of the blend which is the object of this invention.

A mixture was prepared by melting 40% of HIPS containing 6% of polybutadiene (Innova R 870E) and 60% of PLLA, with 10% of a PS-PLA compatibilizing agent in relation to the total HIPS and PLA. The materials were mixed via extrusion at 180° C., and the resulting blend was cooled in a water bath. There was no phase separation and the mechanical and thermal properties of the blend were homogeneous. Izod impact resistance (as per ASTM D 256) was 15 J/m, and heat deflection temperature (HDT, as per ASTM D 684) was 56° C.

The invention claimed is:

1. A polystyrene and polylactic acid blend, characterized by having:
   a) a mixture of polystyrene (PS)/polylactic acid (PLA), wherein the polystyrene is a high impact polystyrene (HIPS), having as its base a matrix of styrene-based polymer and, dispersed in this matrix, a rubber phase made of discrete particles of rubber based on butadiene and/or styrene-butadiene, and where the polystyrene has a concentration from 70% m/m to 30% m/m, and the PLA has a concentration from 30% m/m to 70% m/m; and
   b) PS-PLA block copolymer in concentrations of 0.1% to 15% in relation to the mixture of polystyrene/PLA.

2. The polystyrene and polylactic acid blend according to claim 1, wherein the polystyrene is in concentrations from 60% m/m to 40% m/m in the mixture of polystyrene/polylactic acid.

3. The polystyrene and polylactic acid blend according to claim 1, wherein the polylactic acid concentrations are in the range from 40% m/m to 60% m/m in the mixture of polystyrene/poly-lactic acid.

4. The polystyrene and polylactic acid blend according to claim 1, wherein the PS-PLA copolymer is in concentrations from 3% m/m to 12% m/m in relation to the mixture of polystyrene/polylactic acid.

5. The polystyrene and polylactic acid blend according to claim 1, wherein the PS-PLA copolymer concentrations are from 5% m/m to 10% m/m in relation to the mixture of polystyrene/polylactic acid.

6. The polystyrene and polylactic acid blend according to claim 1, wherein the concentration by mass of the rubber phase in the polymeric matrix varies between 3% and 15%, in relation to the total mass of the polystyrene.

7. The polystyrene and polylactic acid blend according to claim 1, wherein the rubber phase is constituted by rubber particles representing a morphology of the types "core shell" or "salami", or even a mixture of those in different proportions.

8. The polystyrene and polylactic acid blend according to claim 7, wherein the average diameter of the rubber particles range is from 0.1 microns to 8 microns over a distribution curve of particle sizes.

9. The polystyrene and polylactic acid blend according to claim 1, wherein the styrene-based polymeric matrix comprising styrene presents average weighted molar mass (Mw) between 120,000 g/mol and 300,000 g/mol.

10. The polystyrene and polylactic acid blend according to claim 1, wherein the appropriate PLA for this blend is obtained through lactic ring opening polymerization.

11. The polystyrene and polylactic acid blend according to claim 1, wherein the PLA present different D or L isomers, that is, it can generate PLLA, PDLA or even a mixture of isomers, generating PDLLA is present as PLLA, PDLA, and/or PDLLA.

12. The polystyrene and polylactic acid blend according to claim 1, wherein the average PLA number molar mass (Mn) is from 30,000 g/mol to 200,000 g/mol.

13. The polystyrene and polylactic acid blend according to claim 1, wherein the average PLA number molar mass (Mn) is from 50,000 g/mol to 160,000 g/mol.

14. The polystyrene and polylactic acid blend according to claim 1, wherein the PS-PLA block copolymer is obtained in two steps, the first step the PS block with OH thermal functionality (hydroxyl group) is synthesized via atom transfer radical polymerization (ATRP), and using tribromoethanol as the trigger; and in the second step the PS-OH block is used to initiate the polymerization via opening of the lactic ring, forming the PS-PLA block copolymer.

15. The polystyrene and polylactic acid blend according to claim 14, wherein the average number molar mass (Mn) of the PS block is from 2,000 g/mol to 20,000 g/mol, and the average number molar mass (Mn) of the PLA block is from 2,000 g/mol to 20,000 g/mol.

16. The polystyrene and polylactic acid blend according to claim 14, wherein the average number molar mass (Mn) of the PLA block is from 5,000 g/mol to 15,000 g/mol.

17. The polystyrene and polylactic acid blend according to claim 14, wherein the average number molar mass (Mn) of HIPS is from 5,000 g/mol to 15,000 g/mol.

18. A pelleted composition prepared by extruding the blend according to claim 1, in a single or double-screw extruder, at temperatures between 160° C. and 230° C., followed by cooling and then pelletizing.

19. The pelleted composition according to claim 18, wherein the temperature of the blend in the extruder is between 165° C. and 210° C.

20. The pelleted composition according to claim 18, wherein the temperature of the blend in the extruder is between 170° C. and 190° C.

21. The pelleted composition according to claim 18, wherein the polylactic acid in the polystyrene/polylactic acid mixture is PLLA.

\* \* \* \* \*